US007672698B2

(12) United States Patent
Kang

(10) Patent No.: US 7,672,698 B2
(45) Date of Patent: Mar. 2, 2010

(54) SPECIFIC ABSORPTION RATE REDUCER, MOBILE TERMINAL USING THE SAME AND METHOD THEREFOR

(75) Inventor: Tae Kyoung Kang, Gumi-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 849 days.

(21) Appl. No.: 11/472,414

(22) Filed: Jun. 22, 2006

(65) Prior Publication Data

US 2007/0173301 A1 Jul. 26, 2007

(30) Foreign Application Priority Data

Jan. 20, 2006 (KR) ...................... 10-2006-0006058

(51) Int. Cl.
*H04M 1/00* (2006.01)

(52) U.S. Cl. ................. 455/575.3; 455/562.1; 455/566; 455/575.1; 379/428.01; 379/433.01; 343/703

(58) Field of Classification Search .............. 455/575.3, 455/90.2, 9.3, 101, 128, 129, 550.1, 562.1, 455/566, 575.1, 575.7; 379/428.01, 428.03, 379/429, 433.01, 433.05; 343/702, 703
See application file for complete search history.

(56) References Cited

U.S. PATENT DOCUMENTS 7,158,083 B2 * 1/2007 Satoh et al. ................. 343/702
2004/0204027 A1 * 10/2004 Park et al. ................ 455/550.1
2005/0001773 A1 * 1/2005 Morningstar et al. ......... 343/702

FOREIGN PATENT DOCUMENTS

| | | | |
|---|---|---|---|
| CN | 1582106 | | 2/2005 |
| DE | 10 2004 032 211 | A1 | 1/2006 |
| EP | 1 505 800 | A2 | 2/2005 |
| JP | 2002246822 | | 8/2002 |
| JP | 2004-201179 | | 7/2004 |
| JP | 2005-76291 | | 6/2005 |
| JP | 2005-176291 | | 6/2005 |
| KR | 1020030027512 | A | 4/2003 |
| KR | 1020040020218 | A | 3/2004 |
| KR | 1020050017765 | A | 2/2005 |

* cited by examiner

*Primary Examiner*—Matthew D Anderson
*Assistant Examiner*—Shaima Q Aminzay
(74) *Attorney, Agent, or Firm*—Roylance, Abrams, Berdo & Goodman, LLP

(57) ABSTRACT

A mobile terminal and a specific absorption rate reducer method are provided, in which a printed circuit board (PCB) is installed in a main-body, a liquid crystal display (LCD) module is installed in a sub-body, a hinge connects the main-body and the sub-body rotatively and generates a current in the opposite direction to a current generated during the operation of the mobile terminal in a calling mode, and a filter controls a frequency pass characteristic of the mobile terminal by controlling the current flowing in the hinge. Accordingly, frequency pass characteristics may be set differently according to frequency bands by controlling the current flowing in the hinge with a filter having a lumped constant circuit.

17 Claims, 6 Drawing Sheets

200

SPECIFIC ABSORPTION RATE REDUCER, MOBILE TERMINAL USING THE SAME AND METHOD THEREFOR

PRIORITY

This application claims the benefit under 35 U.S.C. § 119 (a) of Korean Patent Application filed in the Korean Intellectual Property Office on Jan. 20, 2006 and assigned Ser. No. 2006-0006058, the entire disclosure of which is hereby incorporated by reference.

BACKGROUND OF THE INVENTION

1. Field of the Invention

The present invention relates to a mobile terminal. More particularly, the present invention relates to a specific absorption rate reducer method for decreasing the specific absorption rate by decreasing the density of current emitted by an antenna of a mobile terminal through a connection part of a main-body and a sub-body, and a mobile terminal using the same.

2. Description of the Prior Art

Generally, a mobile terminal may be classified as a bar type, flip type, or folder type according to its appearance.

The bar type mobile terminal is configured with a data input/output means and a transmitting/receiving module installed in a main-body housing. However, the bar type mobile terminal has a disadvantage in which unintended operation may occur because of having an exposed keypad as a data input means. The bar type also has a limitation in miniaturizing the mobile terminal because of difficulties in securing a great enough distance between a transmitter and a receiver.

The flip type mobile terminal is configured with a main-body, a flip-part, and a hinge connecting the flip-part to the main-body. The flip type mobile terminal has a data input/output means and a transmitting/receiving module installed in the main-body, and may avoid unintended operation by closing a keypad as a data input means with the flip-part. However, the flip type mobile terminal also has a limitation in miniaturizing the mobile terminal because of difficulties in securing a great enough distance between a transmitter and a receiver.

The folder type mobile terminal is configured with a main-body, a folder, and a hinge connecting the folder to the main-body rotatively. The folder type mobile terminal may avoid unintended operation of a keypad by closing the folder tightly to the main-body in a waiting mode, and a great enough distance between a transmitter and a receiver may be secured by opening the folder in a calling mode. Accordingly, the folder type mobile terminal has advantages in miniaturizing the mobile terminal.

Among the above mobile terminals, the present invention utilizes the folder type mobile terminal shown in FIG. 1. FIG. 1 is a perspective view showing a conventional folder type mobile terminal. Referring to FIG. 1, a main-body 110 and a sub-body 150 of the conventional folder type mobile terminal 100 are rotatively assembled to be folded or unfolded by a hinge (not shown). The folder type mobile terminal 100 generally has an antenna (not shown) installed at the connection part of the main-body 110 and the sub-body 150. As a result, a problem exists in that a strong electric field formed by the antenna spreads through the space between the main-body 110 and the sub-body 150.

FIG. 2 is a view showing an electric field formed by a current generated in a calling mode of the mobile terminal shown in FIG. 1. Referring to FIG. 2, if the folder type mobile terminal 100 operates in a calling mode, a current flows in the direction of the arrows, and an electric field A is formed in the surroundings of the folder type mobile terminal 100 as shown in FIG. 2. This electric field generates electromagnetic waves, which may be absorbed by a caller's head and have a harmful influence on the human body.

Accordingly, regulation of electromagnetic wave radiation becomes tighter worldwide. Specific absorption rate (hereafter referred to as 'SAR'), a measure indicating the rate of electromagnetic waves absorbed by the human body (especially by the head), is used for a standard of human body protection. Accordingly, apparatus and methods for reducing the SAR are being developed.

For example, a ground contact device using a hinge is used as an apparatus for reducing the SAR.

FIG. 3 is a schematic block diagram of a mobile terminal including a SAR reducer in the prior art. Referring to FIG. 3, the mobile terminal 100*a* includes a printed circuit board (PCB) 110*a* installed in a main-body, a liquid crystal display (LCD) module 150*a* installed in a folder, and a hinge 170*a* connecting a ground pin GND of the PCB 110*a* and a ground pin GND of the LCD module 150*a*.

The hinge 170*a* generates a current opposite to the direction of a current generated when the mobile terminal 100*a* operates in a calling mode. That is, when the folder type mobile terminal 100*a* operates in a calling mode, if a current flows from the main-body of the mobile terminal 100*a* to the folder, a current in the opposite direction is induced in the hinge 170*a*. Accordingly, displacement current at the front side of the mobile terminal 100*a* (that is, a side contacting the human body) is compensated, and thereby the SAR is decreased.

FIG. 4 is a view showing an electric field formed by a current generated in a calling mode of the mobile terminal having the reducer shown in FIG. 3. Referring to FIG. 4, when the mobile terminal 100*a* shown in FIG. 3 operates in a calling mode, at the rear side of the mobile terminal 100*a* (that is, the side opposite to the side contacting with the human body), a current flows from the main-body to the folder in the direction of the arrows, and a first electric field A is formed in the surroundings of the mobile terminal 100*a* by the current. Additionally, at the front side of the mobile terminal 100*a* (that is, the side contacting with the human body), a current is induced from the folder to the main-body in the direction of the arrows by the current. That is, at a portion installed with the hinge 170*a*, a current is induced in the opposite direction to a current flowing at the rear side of the mobile terminal 100*a*. The current is generated at the front side of the mobile terminal 100*a*, and a second electric field B is thereby formed in the surroundings of the mobile terminal 100*a* by the current as shown in FIG. 4.

Because the first electric field A and the second electric field B overlap at the front side of the mobile terminal 100*a*, the displacement current at the front side of the mobile terminal 100*a* is compensated, and thereby the SAR is decreased.

However, in the radiation characteristic, the SAR and total radiated power (TRP) have a relationship of complementing each other. Accordingly, if the TRP is increased, then the SAR is increased. Conversely, if the TRP is decreased, then the SAR is decreased. In the case of the communication environment utilizing 3 frequency bands, increasing the TRP in a frequency band is limited, because the effect described above applies to all frequency bands.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a SAR reducer increasing TRP in a specific frequency band by setting a pass characteristic differently according to the frequency band.

Another object of exemplary embodiments of the present invention is to provide a SAR reducer reducing SAR and improving TRP performance in a frequency band used by a mobile terminal.

Another object of exemplary embodiments of the present invention is to provide a mobile terminal having the SAR reducer.

In order to achieve the above objects, a specific absorption rate reducer of a mobile terminal having a main-body installed with a PCB and a sub-body installed with an LCD module according to an exemplary embodiment of the present invention comprises a hinge connecting the main-body and the sub-body rotatively and generating a current in the opposite direction to a current generated during the operation of the mobile terminal in a calling mode, and a filter controlling a frequency pass characteristic of the mobile terminal by controlling the current flowing in the hinge.

In an exemplary implementation, a first end of the filter is connected to the hinge and a second end of the filter is connected to a ground pin of the LCD module, or alternatively the first end of the filter is connected to a ground pin of the PCB and the second end of the filter is connected to the hinge.

In another exemplary implementation, the filter includes at least one of a capacitor, an inductor and a resistor.

In still another exemplary implementation, the filter is configured with a lumped constant circuit including a first capacitor C1, a second capacitor C2, and a third capacitor C3 connected in series; an inductor L connected in parallel with the second capacitor C2 located in the center of the capacitors C1, C2, and C3; and a resistor R connected in parallel with the capacitors C1, C2, and C3.

In a further exemplary implementation, when the value of the first capacitor C1 is set to 1 pF, the value of the second capacitor C2 is set to 100 pF, and the value of the third capacitor C3 is set to 100 pF, the filter operates as a low pass filter having an excellent frequency pass characteristic for a cellular system. When the value of the first capacitor C1 is set to 100 pF, the value of the inductor L is set to 1 nH, and the value of the third capacitor C3 is set to 100 pF, the filter operates as a high pass filter having an improved frequency pass characteristic for a personal communication service (PCS) system.

In order to achieve the above objects, a mobile terminal having a main-body and a sub-body according to an exemplary embodiment of the present invention comprises a PCB installed in a main-body, an LCD module installed in a sub-body, a hinge connecting the main-body and the sub-body rotatively and generating a current in the opposite direction to a current generated during the operation of the mobile terminal in a calling mode, and a filter controlling a frequency pass characteristic of the mobile terminal by controlling the current flowing in the hinge.

In order to achieve the above objects, a method for reducing SAR according to an exemplary embodiment of the present invention comprises rotatively connecting a main-body of a mobile terminal and a sub-body of the mobile terminal with a hinge, and generating a current in the opposite direction to a current generated during the operation of the mobile terminal in a calling mode, and controlling a frequency pass characteristic of the mobile terminal by controlling the current flowing in the hinge.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
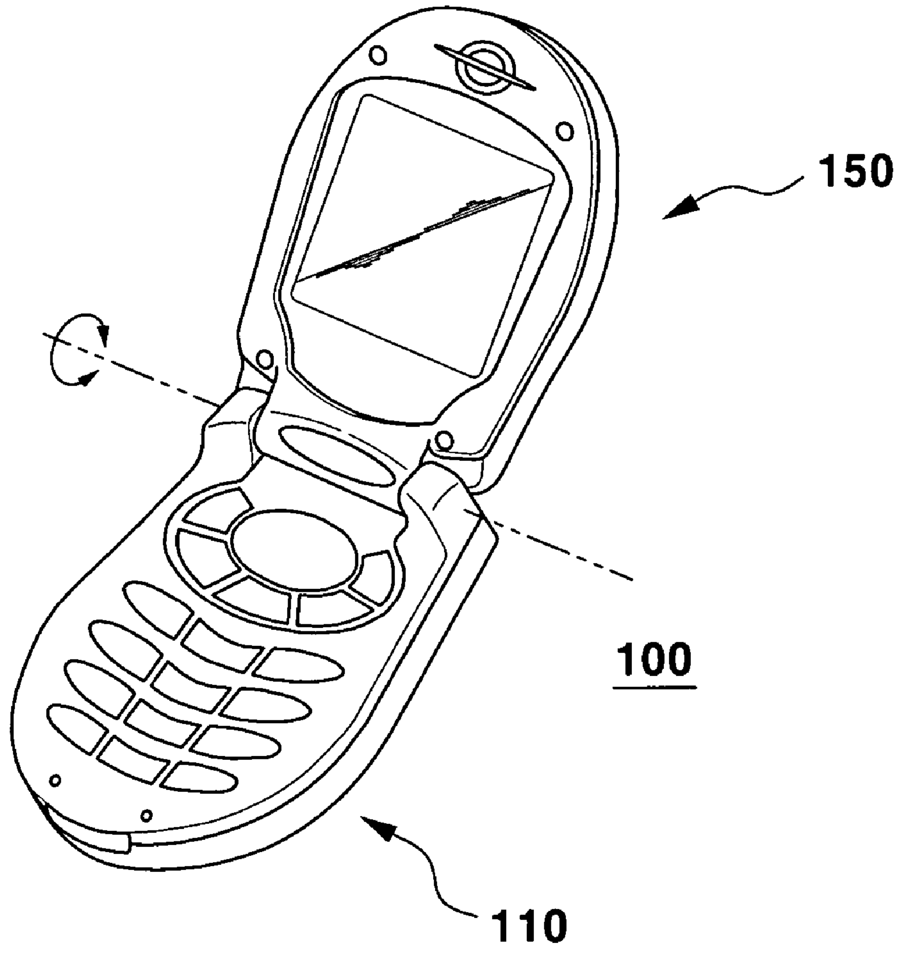
FIG. 1 ( PRIOR ART )
FIG. 1 is a perspective view showing a conventional folder type mobile terminal.
Figure 2:
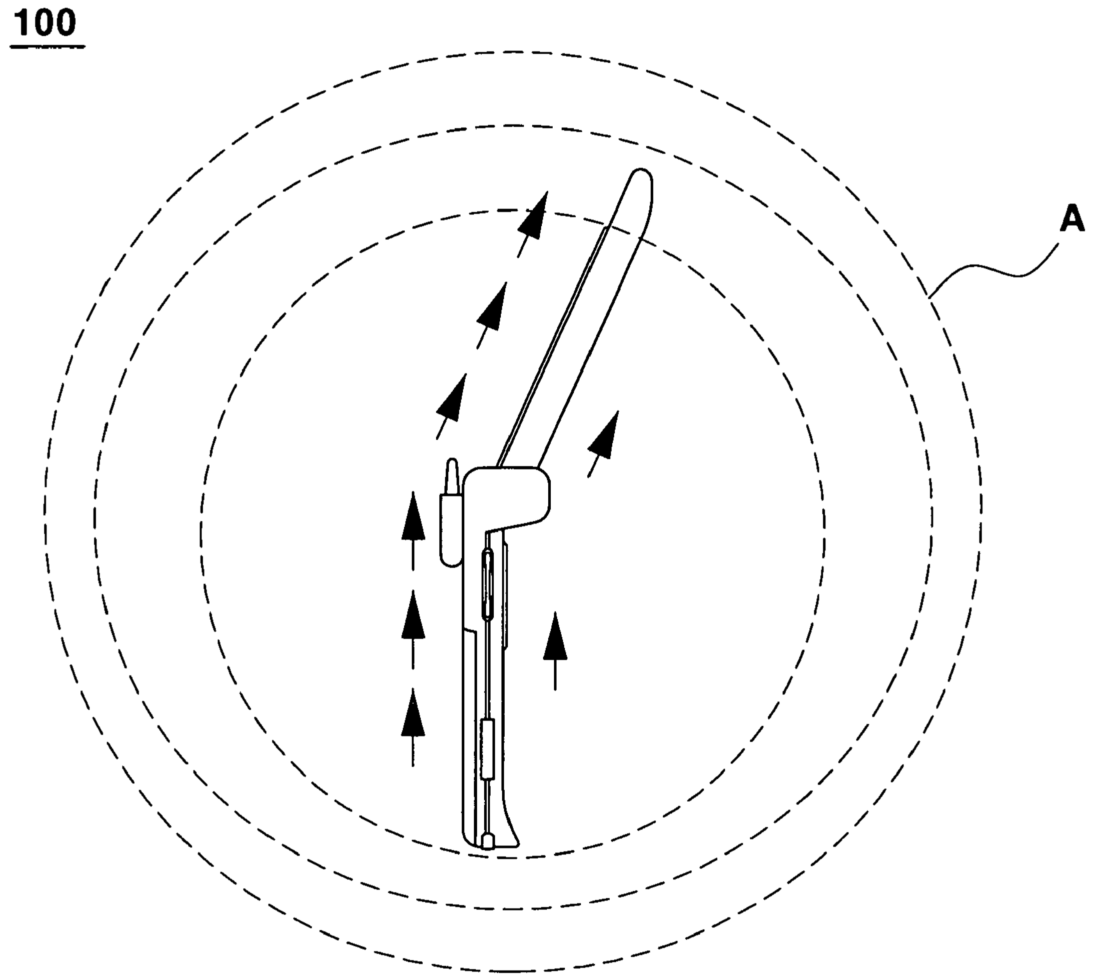
FIG. 2 ( PRIOR ART )
FIG. 2 is a view showing an electric field formed by a current generated in a calling mode of the mobile terminal shown in FIG. 1.
Figure 3:
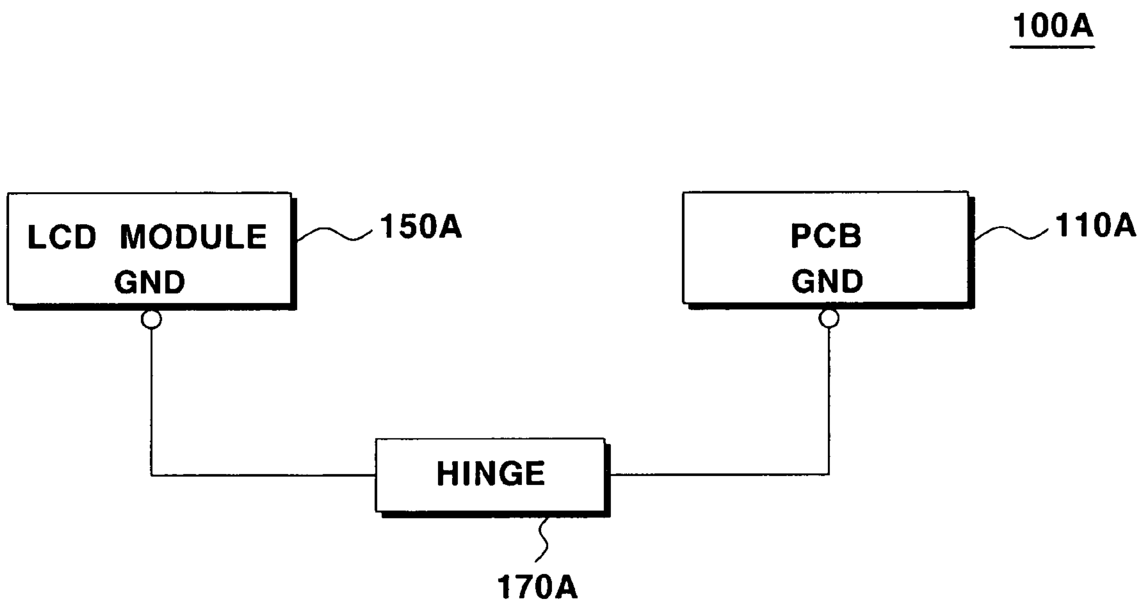
FIG. 3 ( PRIOR ART )
FIG. 3 is a schematic block diagram of a mobile terminal including a SAR reducer in the prior art.
Figure 4:
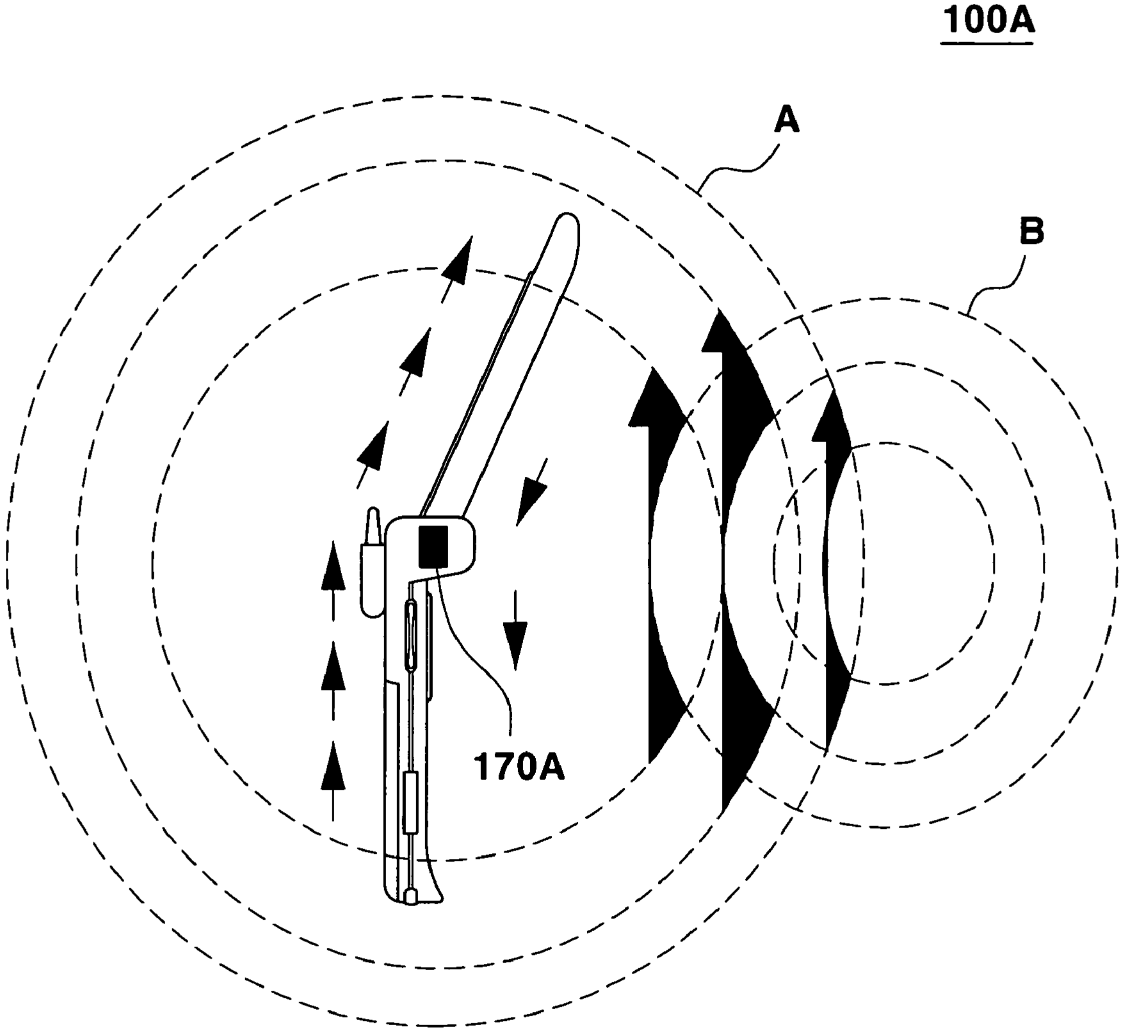
FIG. 4 ( PRIOR ART )
FIG. 4 is a view showing an electric field according to a current generated in a calling mode of the mobile terminal having the SAR reducer shown in FIG. 3.
Figure 5:
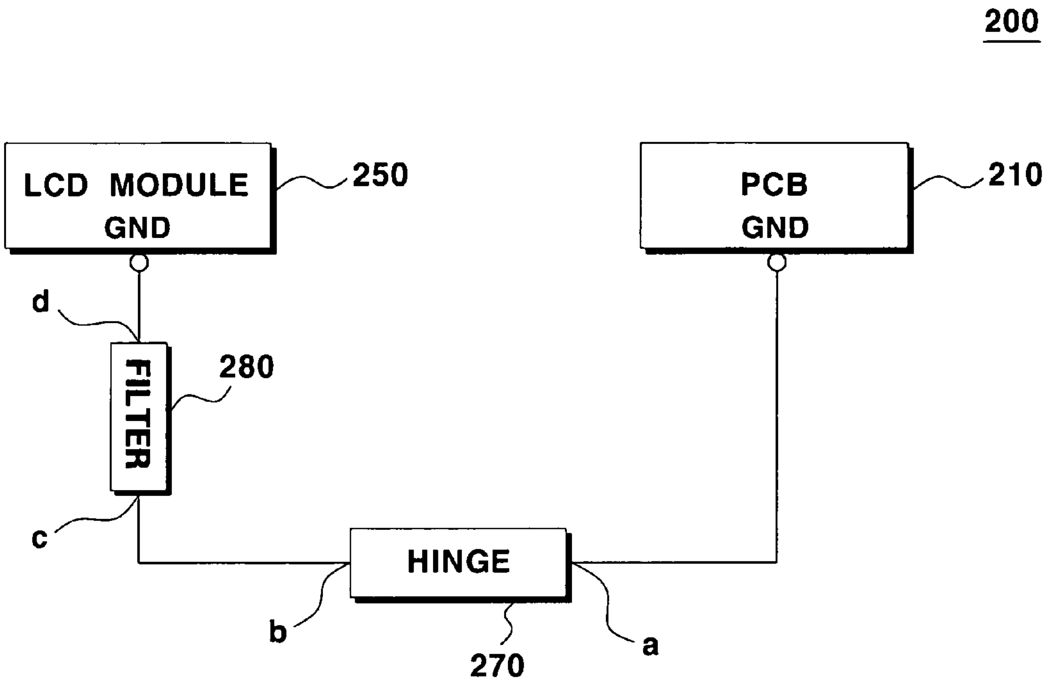
FIG. 5 is a schematic block diagram of a mobile terminal having a SAR reducer according to an exemplary embodiment of the present invention.

FIG. 5 is a schematic block diagram of a mobile terminal having a SAR reducer according to an exemplary embodiment of the present invention. Referring to FIG. 5, the mobile terminal 200 includes a PCB 210 installed in a main-body, LCD module 250 installed in a folder, hinge 270 of which a first end 'a' is connected to a ground pin GND of the PCB 210, and a filter 280 of which a first end 'c' is connected to a second end 'b' of the hinge 270 and a second end 'd' is connected to a ground pin GND of the LCD module 250.

The hinge 270 generates a current opposite to the direction of a current generated when the mobile terminal 200 operates in a calling mode.

The filter 280 regulates the SAR and TRP by controlling the rate of current flowing through the hinge 270. For this purpose, the filter 280 is, for example, configured with a lumped constant circuit including at least one of a capacitor, an inductor, and a resistor.

Figure 6:
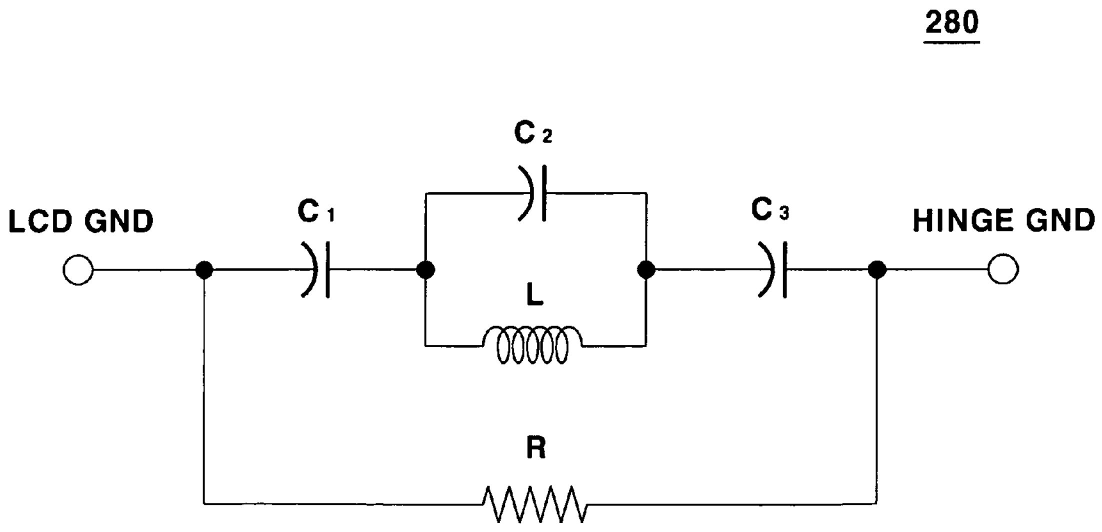
FIG. 6 is a view showing a configuration of the filter shown in FIG. 5.

The filter 280 configured with the lumped constant circuit according to an exemplary embodiment of the present invention is shown in FIG. 6. Referring to FIG. 6, the filter 280 includes a plurality of capacitors, such as a first capacitor C1, second capacitor C2, and third capacitor C3, connected in series between a ground pin GND of an LCD module and a ground contact GND of a hinge; an inductor L connected in parallel with the second capacitor C2 located in the center of the capacitors C1, C2, and C3; and a resistor R connected in parallel with the plurality of capacitors C1, C2, and C3 connected in series. The filter 280 configured in this manner differentiates a frequency pass characteristic of the circuit by adjusting the values of the capacitors C1, C2, and C3, the inductor L, and the resistor R. That is, the filter 280 regulates a frequency pass characteristic of the circuit according to the characteristics of newly developed models of the mobile terminal by increasing or decreasing ground effect of the hinge in a specific frequency band by adjusting the values of the capacitors C1, C2, and C3, the inductor L, and the resistor R.

Figure 7:
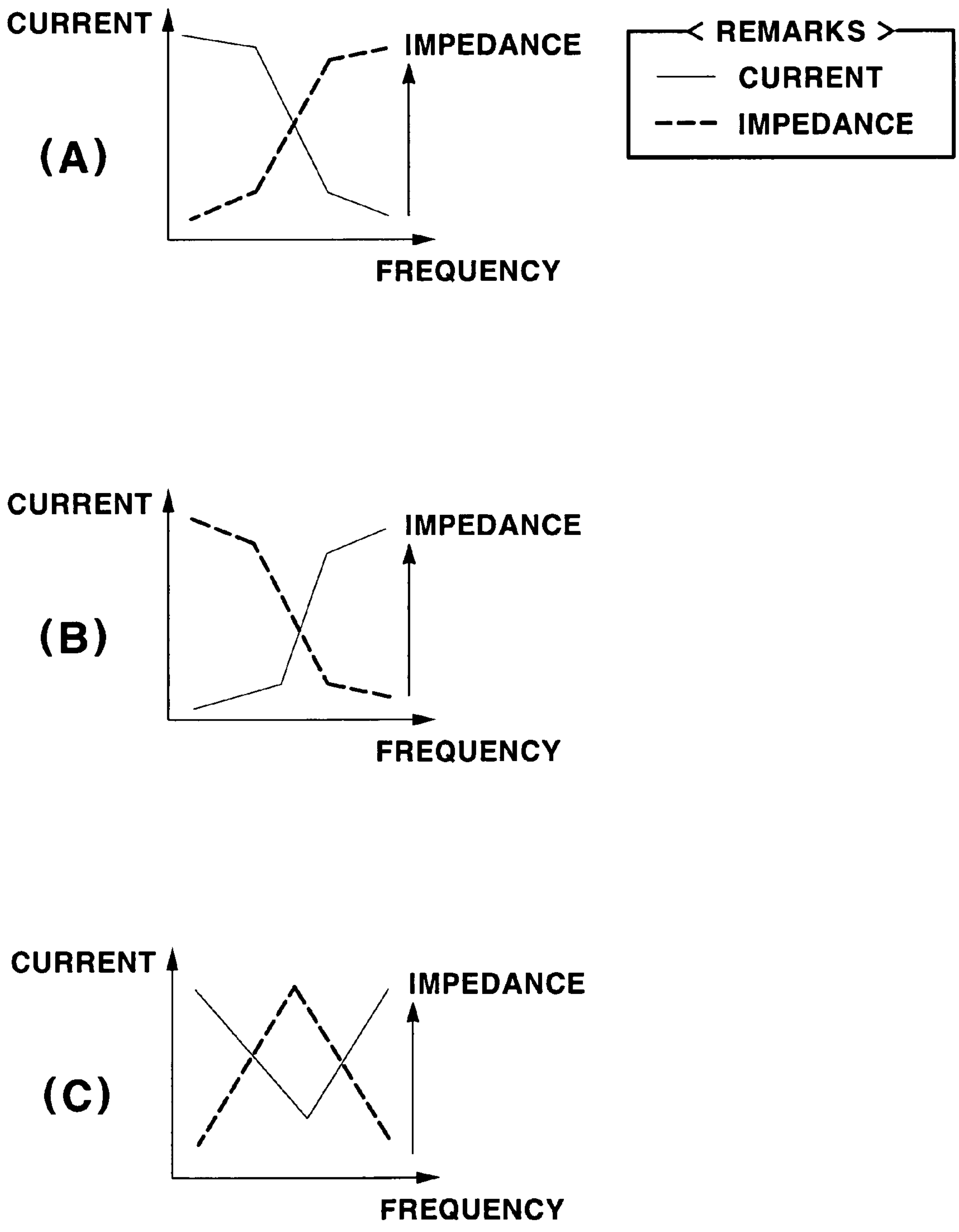
FIG. 7 shows graphs of frequency pass characteristics of the mobile terminal according to an exemplary embodiment of the present invention.

For example, when the value of C1 is set to 1 pF, the value of C2 is set to 100 pF, and the value of C3 is set to 100 pF, the filter 280 operates as a low pass filter, as shown in FIG. 7(A), and improves the frequency pass characteristic of a cellular system (for example, code division multiple access (CDMA)) having a relatively low frequency band of 824~849 MHz.

Alternatively, in the case that the value of C1 is set to 100 pF, the value of L is set to 1 nH, and the value of C3 is set to 100 pF, the filter 280 operates as a high pass filter as shown in FIG. 7(B), and improves the frequency pass characteristic of a personal communication service (PCS) system having a relatively high frequency band of 1850~1990 MHz.

Further, the filter 280 may improve the frequency pass characteristic in a center frequency band as shown in FIG. 7(C) by adjusting the values of the capacitors C1, C2, and C3, the inductor L, and the resistor R.

FIG. 5 shows an example where the filter 280 is connected between the ground pin GND of the LCD module 250 and the hinge 270. However, the present invention is not limited to the configuration in which the filter 280 is connected to the above locations. For example, the filter 280 may be connected between the ground pin GND of the PCB 210 and the hinge 270. That is, the second end 'd' of the filter 280 may be connected to the first end 'a' of the hinge 270 and the first end 'c' of the filter 280 may be connected to the ground pin GND of the PCB 210.

FIG. 6 is a view showing a configuration of the filter 280 according to an exemplary embodiment of the present invention. However, the configuration of the filter 280 according to an exemplary embodiment of the present invention is not limited to that shown in FIG. 6. The filter 280 may be configured to comprise at least one of a capacitor, an inductor and a resistor.

As described above, certain exemplary embodiments of the present invention can provide frequency pass characteristics in different frequency bands by using a filter configured with a lumped constant circuit and controlling the rate of a current flowing through a hinge. Accordingly, certain exemplary embodiments of the present invention may decrease the SAR and increase the TRP in a specific frequency band. That is, certain exemplary embodiments of the present invention may reduce SAR and improve TRP performance in a specific frequency band.

Although certain exemplary embodiments for improving a pass characteristic in a frequency band used by a cellular system or a PCS system have been illustrated, frequency pass characteristics of other frequency bands may also be improved by changing the values of components configuring the lumped constant circuit.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A specific absorption rate reducer comprising:

a hinge for rotatively connecting a main-body of a mobile terminal and a sub-body of the mobile terminal, and generating a current in the opposite direction to a current generated during the operation of the mobile terminal in a calling mode; and a filter for controlling a frequency pass characteristic of the mobile terminal by controlling the current flowing in the hinge, and being located between the hinge and either the main-body or the sub-body.

2. The specific absorption rate reducer of claim 1, wherein the sub-body comprises a liquid crystal display (LCD) module, and the filter is connected to the hinge and to a ground pin of the LCD module.

3. The specific absorption rate reducer of claim 2, wherein the filter comprises at least one of a capacitor, an inductor, and a resistor.

4. The specific absorption rate reducer of claim 2, wherein the filter comprises a lumped constant circuit comprising:

a first capacitor C1, a second capacitor C2, and a third capacitor C3 connected in series;

an inductor L connected in parallel with the second capacitor C2 located in the center of the capacitors C1, C2, and C3; and a resistor R connected in parallel with the capacitors C1, C2, and C3.

5. The specific absorption rate reducer of claim 1, wherein the main-body comprises a printed circuit board (PCB), and the filter is connected to a ground pin of the PCB and to the hinge.

6. The method of claim 5, wherein the filter comprises at least one of a capacitor, an inductor, and a resistor.

7. The method of claim 5, wherein the filter comprises a lumped constant circuit comprising:

a first capacitor C1, a second capacitor C2, and a third capacitor C3 connected in series;

an inductor L connected in parallel with the second capacitor C2 located in the center of the capacitors C1, C2, and C3; and a resistor R connected in parallel with the capacitors C1, C2, and C3.

8. A mobile terminal comprising:

a main-body;

a sub-body;

a printed circuit board (PCB) installed in the main-body;

a liquid crystal display (LCD) module installed in the sub-body;

a hinge for connecting the main-body and the sub-body rotatively and generating a current in the opposite direction to a current generated during the operation of the mobile terminal in a calling mode; and a filter for controlling a frequency pass characteristic of the mobile terminal by controlling the current flowing in the hinge, wherein the filter is connected to the hinge and to a ground pin of the liquid crystal display module or the filter is connected to a ground pin of the printed circuit board and to the hinge.

9. The mobile terminal of claim 8 wherein the filter comprises at least one of a capacitor, an inductor, and a resistor.

10. The mobile terminal of claim 8 wherein the filter comprises a lumped constant circuit comprising:

a first capacitor C1, a second capacitor C2, and a third capacitor C3 connected in series;

an inductor L connected in parallel with the second capacitor C2 located in the center of the capacitors C1, C2, and C3; and a resistor R connected in parallel with the capacitors C1, C2, and C3.

11. A method for reducing specific absorption rate in a mobile terminal, the method comprising:

rotatively connecting a main-body of a mobile terminal and a sub-body of the mobile terminal with a hinge, connecting a filter to the hinge and either the main-body or the sub-body, and generating a current in the opposite direction to a current generated during the operation of the mobile terminal in a calling mode;

controlling a frequency pass characteristic of the mobile terminal by controlling the current flowing in the hinge.

12. The method of claim 11, wherein the sub-body comprises a liquid crystal display (LCD) module, and the controlling comprises connecting a filter to the hinge and to a ground pin of the LCD module.

13. The mobile terminal of claim 12, wherein the filter comprises at least one of a capacitor, an inductor, and a resistor.

14. The method of claim 12, wherein the filter comprises a lumped constant circuit comprising:

a first capacitor C1, a second capacitor C2, and a third capacitor C3 connected in series;

an inductor L connected in parallel with the second capacitor C2 located in the center of the capacitors C1, C2, and C3; and a resistor R connected in parallel with the capacitors C1, C2, and C3.

15. The method of claim 11, wherein the main-body comprises a printed circuit board (PCB), and the controlling comprises connecting a filter to a ground pin of the PCB and to the hinge.

16. The method of claim 15, wherein the filter comprises at least one of a capacitor, an inductor, and a resistor.

17. The method of claim 15, wherein the filter comprises a lumped constant circuit comprising:

a first capacitor C1, a second capacitor C2, and a third capacitor C3 connected in series;

an inductor L connected in parallel with the second capacitor C2 located in the center of the capacitors C1, C2, and C3; and a resistor R connected in parallel with the capacitors C1, C2, and C3.

* * * * *